(12) United States Patent
Jing et al.

(10) Patent No.: US 10,723,888 B2
(45) Date of Patent: Jul. 28, 2020

(54) ANTI-FOG COATING COMPOSITION INCLUDING FUNCTIONALIZED SILICA NANOPARTICLES AND MULTIFUNCTIONAL (METH)ACRYLATE MONOMERS

(71) Applicant: 3M INNOVATIVE PROPERTIES COMPANY, St. Paul, MN (US)

(72) Inventors: Naiyong Jing, St. Paul, MN (US); Xue Tian, Woodbury, MN (US); Xiaohai Sheng, Shanghai (CN); Zhengjun Wang, Shanghai (CN); Gezahegn D. Damte, Cottage Grove, MN (US); Zhigang Yu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 100 days.

(21) Appl. No.: 16/062,408

(22) PCT Filed: Dec. 31, 2015

(86) PCT No.: PCT/CN2015/100062
§ 371 (c)(1),
(2) Date: Jun. 14, 2018

(87) PCT Pub. No.: WO2017/113269
PCT Pub. Date: Jul. 6, 2017

(65) Prior Publication Data
US 2018/0371286 A1    Dec. 27, 2018

(51) Int. Cl.
| | | |
|---|---|---|
| *C09D 4/00* | (2006.01) | |
| *C09C 1/30* | (2006.01) | |
| *C09D 5/00* | (2006.01) | |
| *C09D 7/62* | (2018.01) | |
| *C09D 163/10* | (2006.01) | |
| *C09D 175/14* | (2006.01) | |
| *C09D 7/61* | (2018.01) | |
| *C08K 3/36* | (2006.01) | |
| *C08K 9/08* | (2006.01) | |
| *C08F 222/10* | (2006.01) | |

(52) U.S. Cl.
CPC ............ *C09D 4/00* (2013.01); *C09C 1/3072* (2013.01); *C09C 1/3081* (2013.01); *C09D 5/00* (2013.01); *C09D 7/61* (2018.01); *C09D 7/62* (2018.01); *C09D 163/10* (2013.01); *C09D 175/14* (2013.01); *C08F 222/1065* (2020.02); *C08F 2800/20* (2013.01); *C08K 3/36* (2013.01); *C08K 9/08* (2013.01); *C08K 2201/003* (2013.01)

(58) Field of Classification Search
CPC ...... C09C 1/3072; C09C 1/3081; C09C 1/309
See application file for complete search history.

(56) References Cited

U.S. PATENT DOCUMENTS

| | | | |
|---|---|---|---|
| 3,822,238 A | 7/1974 | Blair | |
| 4,491,508 A * | 1/1985 | Olson | ............... C08F 222/1006 428/412 |
| 4,551,484 A | 11/1985 | Radisch | |
| 4,609,688 A | 9/1986 | Radisch | |
| 4,906,446 A * | 3/1990 | Engelbrecht | ............ C09C 1/309 423/335 |
| 5,258,225 A * | 11/1993 | Katsamberis | ........ C09D 175/16 428/331 |
| 5,723,175 A | 3/1998 | Scholz | |
| 5,753,373 A | 5/1998 | Scholz | |
| 5,846,650 A | 12/1998 | Ko | |
| 5,958,598 A | 9/1999 | Khudyakov | |
| 6,420,622 B1 | 7/2002 | Johnston | |
| 7,008,979 B2 | 3/2006 | Schottman | |
| 7,776,937 B2 | 8/2010 | Kato | |
| 8,367,209 B2 | 2/2013 | Zhang | |
| 8,448,885 B2 | 5/2013 | Nelson | |
| 8,597,959 B2 | 12/2013 | Jing | |
| 2003/0203991 A1 | 10/2003 | Schottman | |
| 2006/0134169 A1 | 6/2006 | Linhardt | |
| 2008/0118658 A1 | 5/2008 | Kato | |
| 2008/0280138 A1 | 11/2008 | Currie | |
| 2011/0098411 A1* | 4/2011 | Yamaki | ................. C08F 292/00 525/209 |
| 2011/0250442 A1* | 10/2011 | Castro | .................... B82Y 10/00 428/336 |
| 2013/0157066 A1 | 6/2013 | Cheng | |
| 2013/0315835 A1 | 11/2013 | Bonacchi | |
| 2015/0118501 A1 | 4/2015 | Lu | |

FOREIGN PATENT DOCUMENTS

| | | |
|---|---|---|
| CN | 102119176 | 7/2011 |
| CN | 104080861 | 10/2014 |
| CN | 104449185 | 3/2015 |
| EP | 0399441 | 11/1990 |
| JP | 2004-083846 | * 3/2004 |
| WO | WO 1997-043668 | 11/1997 |
| WO | WO 2009/118415 | * 10/2009 |
| WO | WO 2013-089926 | 6/2013 |
| WO | WO 2013/089927 | 6/2013 |

OTHER PUBLICATIONS

Machine translation of JP 2004-083846 (no date).*

(Continued)

Primary Examiner — Marc S Zimmer
(74) Attorney, Agent, or Firm — Adrian L. Pishko

(57) ABSTRACT

Coating compositions are described including silica nanoparticles functionalized with an alkenyl silane, a dispersing agent, and a compound including a polyethylene oxide segment containing at least one hydroxyl group, at least one silane, and optionally a hydrophobic group. The coating compositions further include at least two multifunctional (meth) acrylate monomers. Also described are articles including the dried and cured coating composition disposed on a substrate. The articles exhibit anti-fog characteristics and often also mechanical durability.

16 Claims, 1 Drawing Sheet

(56) References Cited

OTHER PUBLICATIONS

Google image result for the structure of Tergitol TMN 10.*
Chang, Preparation of Water-Resistant Antifog Hard Coatings on Plastic Substrate, Langmuir, Nov. 2012, vol. 28, No. 49, pp. 17193-17201.
International Search Report for PCT International Application No. PCT/CN2015/100062, dated May 27, 2016, 3 pages.

* cited by examiner

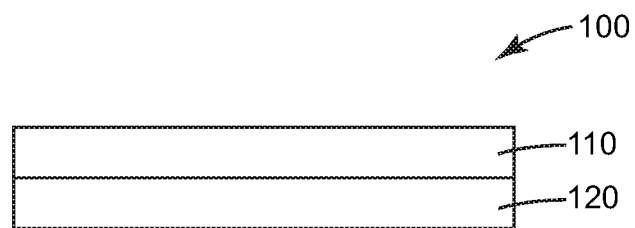

ANTI-FOG COATING COMPOSITION INCLUDING FUNCTIONALIZED SILICA NANOPARTICLES AND MULTIFUNCTIONAL (METH)ACRYLATE MONOMERS

CROSS REFERENCE TO RELATED APPLICATIONS

This application is a national stage filing under 35 U.S.C. 371 of PCT/CN2015/100062, filed Dec. 31, 2015, the disclosure of which is incorporated by reference in its entirety herein.

FIELD

The present disclosure relates to anti-fog coating compositions.

BACKGROUND

As described for example in U.S. Pat. No. 7,008,979; fog formation occurs under conditions of high humidity and high temperature or at interfacial boundaries where there is a large temperature and humidity difference. Coatings which reportedly reduce the tendency for surfaces to "fog up" (i.e., anti-fogging coatings) have been suggested.

In order to prevent this fogging, it is known to use various surface active agents to provide anti-fog properties to articles by adding hydrophilic agents to polymeric compositions in order to impart anti-fog properties. For example, anti-fog coating compositions for transparent surfaces which include a three-dimensional cross-linked polyurethane having a free surface active agent disposed within open domains in its cross-linked structure have been suggested. The coating compositions are prepared by reacting isocyanates with polyfunctional polyols to obtain a polyurethane, and subsequently contacting the thus prepared polyurethane with a hydrophilic surface-active agent in order to diffuse molecules of the surface-active agent into the interior of the coating. (See for example U.S. Pat. Nos. 4,551,484 and 4,609,688 to Radisch et al.) The surface-active agent, however, is not chemically reacted into the polyurethane, but is instead physically disposed within the polymeric structure. As such, the cured coating is susceptible to undesirable leaching and erosion of the surfactant, thereby decreasing the anti-fog properties of the coating composition. Similarly, EP 0399441 to Chen et al. discloses an antifog coating composition including a highly crosslinked acrylic coating or a nanosilica-containing hardcoat and a free-surfactant. WO 1997/043668 to Ko et al. discloses articles including a coating on the surface of a substrate, in which the coating contains a fluoropolymer and a fluorchemical surfactant.

It has also been proposed to react surface active agents into a polymeric coating composition in order to impart anti-fog properties to the coating composition. For example, the addition of sulfonated "resins" to polyurethanes in order to prepare coatings with various properties including anti-fog characteristics have been suggested. The resins are prepared from diols or diamines reacted with di-carboxylic acid esters, followed by sulfonation of double bonds or quarternization of amines. The resins are intended to increase the hydrophilic character and water absorption of the polyurethane coatings by reacting into the polyurethane backbone in an end-to-end fashion, rather than as pendent groups. Such resins which react in an end-to-end fashion, as opposed to remaining pendant at the end of the polyurethane chain, cannot provide for a clear delineation of hydrophilic and hydrophobic groups and in this respect do not behave as surfactants, i.e., they do not provide cooperation between distinct hydrophilic and hydrophobic portions to reduce interfacial tension. (See for example U.S. Pat. No. 3,822,238 to Blair et al.) In addition, U.S. Pat. No. 7,776,937 to Kato et al. discloses a photocurable two-part coating composition including a multifunctional acryloyl-containing urethane compound and a multifunctional acrylate having at least two free-hydroxyl groups. Langmuir vol. 28, issue 49, pp. 17193-17201 (2012) to Chang et al. discloses a two layered construction having an organic-inorganic composite acrylic hardcoat as a supporting layer at the bottom, and an anti-fog coating layer containing an acryloyl functional surfactant copolymer on the supporting layer. However, these compositions do not provide permanent fog resistance properties, i.e. fog resistant properties which last after repeated washings or extended soaking in water, nor are they effective for more than a few hours of use.

SUMMARY

Although various anti-fog coatings have been described, industry would find advantage in alternative compositions that can provide mechanically strong, yet water-resistant persistent long-lasting anti-fog properties.

In a first aspect, a coating composition is provided including silica nanoparticles functionalized with an alkenyl silane, a dispersing agent, and a compound including a polyethylene oxide (polyhydroxylethyleneoxy) segment containing at least one hydroxyl group, at least one silane, and optionally a hydrophobic group. The coating compositions further include at least two multifunctional (meth)acrylate monomers.

In a second aspect, a coating composition is provided including two groups of functionalized silica nanoparticles, a first multifunctional (meth)acrylate monomer, and a second multifunctional (meth)acrylate monomer. The first group of silica nanoparticles is functionalized with a dispersing agent and a compound including a polyethylene oxide segment containing at least one hydroxyl group, at least one functional silane, and optionally a hydrophobic group. The second group of silica nanoparticles is functionalized with the dispersing agent and an alkenyl silane.

In a third aspect, an article is provided including a dried and cured coating composition disposed on a substrate. The coating composition is of the first aspect or the second aspect. The articles exhibit anti-fog characteristics and often also mechanical durability.

BRIEF DESCRIPTION OF THE DRAWINGS

FIG. 1 is a schematic cross-section of an exemplary article according to the present disclosure.

DETAILED DESCRIPTION OF ILLUSTRATIVE EMBODIMENTS

Having highly hydrophilic groups- or surfactants attached and/or grafted to polymers tends to cause the polymers to exhibit inferior mechanical properties and water resistance. Nanomaterials, especially some inorganic nanomaterials, are hydrophilic, yet water-resistant. They are good building blocks for highly hydrophilic or superhydrophilic coatings. It was discovered that a significant challenge, however, is to create bonds and networks between particles and between particles and binders to provide coating durability. The coating compositions described herein are suitable for imparting anti-fog characteristics. In at least certain embodiments of the coating compositions described herein, mechanical durability is also imparted.

According to at least one embodiment of the present disclosure, abrasion resistant and/or optically clear composite hardcoats are provided. Such compositions may be useful for protective coatings, especially for mechanically strong and long-lasting anti-fog coatings on optical surfaces. The durable coating compositions generally include at least two multifunctional (meth)acrylic monomers and one or more sets of silica nanoparticles to which multiple functional moieties are bound to the nanoparticle surfaces. The functional moieties include one or more compatibilizing groups and alkene or acrylic groups for forming a polymeric network. More specifically, the surfaces of silica nanoparticles are typically covalently attached to one or more dispersing agents, compounds that are silane functionalized surfactants, and acrylic silanes. To achieve water-resistant, abrasion-resistant and long-lasting anti-fog coating performance, it has been discovered that surfactant moieties should be covalently attached to the surfaces of the silica nanoparticles. In contrast, non-covalently attached free surfactants have been shown to cause the resulting coatings to crack, to swell, and to become delaminated (especially after being soaked in water).

The coating compositions are UV curable and are suitable for substrates such as polyethylene terephthalate (PET) and polycarbonate (PC), typically providing excellent anti-fog performance and strong mechanical durability. The coatings are useful, for example, for window films and face shields.

Glossary

The terms "aliphatic group" and "aliphatic moiety" refers to a linear, branched, or cyclic, substituted or unsubstituted, nonpolar hydrocarbon having approximately 4 to 20 carbon atoms.

The term "acrylic" includes any polymer or copolymer of acrylic acid, methacrylic acid, ester of these acids, or acrylonitrile.

The term "(meth)acrylate" refers to both methacrylate and acrylate.

The term "multifunctional (meth)acrylate monomer" refers to any monomer including at least two acrylate and/or methacrylate groups.

The term "hydrolyzable group" refers to a group that is readily cleaved or removed from the atom to which it is bonded by action of liquid water having a pH of from 1 to 10 and atmospheric pressure.

The term "hydrophobic" refers to a material having water-insoluble, nonpolar moieties, such as aliphatic groups.

The term "hydrophilic" refers to a material having at least 60 weight % water-soluble moieties.

The term "segment" refers to a portion of the backbone of any polymeric material that has at least one functional group. For instance, a poly(alkyleneoxy) segment includes at least two (e.g., "poly") alkyleneoxy functional backbone portions.

The term "dispersing agent" refers to a compound having at least one hydrophilic segment.

The term "molecular weight" with respect to monomers and compounds refers to the grams per mole that can simply be calculated based on the chemical formula of the monomer or compound.

The term "optical haze" refers to the ratio of the transmitted light that deviates from the normal direction by more than 4 degrees to the total transmitted light. Haze values can be measured, for instance, using a Haze-guard Plus haze meter (BYK-Gardiner, Silver Springs, Md.) according to the procedure described in ASTM D1003.

The term "optical transmission" refers to the percentage of light that is not either reflected back toward the source or absorbed by the film as a percentage of the total incident light at a wavelength of 550 nm (light emitted/light source× 100).

The term "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The term "heteroalkyl" includes straight-chained, branched, and cyclic alkyl groups with one or more heteroatoms independently selected from S, O, and N, including both unsubstituted and substituted alkyl groups. Unless otherwise indicated, the heteroalkyl groups typically contain from 1 to 20 carbon atoms. Examples of "heteroalkyl" as used herein include, but are not limited to methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

The term "alkylene" is the divalent form of the "alkyl" groups defined above.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, 1-propenyl, and 1-butenyl. Alkenyl groups also encompass acrylate groups.

The term "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. "Heteroaryl" is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

The term "alkoxysilane" refers to the fully- or partially-hydrolyzed condensation reaction product of one or more tetralkoxysilanes and optionally one or more trialkoxysilanes and optionally one or more dialkoxysilanes.

The term "furanose" refers to a five-membered ring system including four carbon atoms and one oxygen atom. The term "pyranose" refers to a six-membered ring system including five carbon atoms and one oxygen atom.

The term "polyurethane" includes any polymeric material that comprises polyurethane segments. The term "polyurethane segment" refers to at least two urethane and/or urea groups that are connected by an organic group.

"Nanoparticles" are herein defined as nanometer-sized particles, preferably with an average particle size of no greater than 100, 75 or 50 nanometers (nm). In some embodiments, the average particle size of the inorganic nanoparticles is no greater than 45, or 40, or 30, or 20 nm (prior to surface modification). The average particle size of the nanoparticles is at least 1 nm, 2 nm, or 3 nm.

As used herein, "particle size" and "particle diameter" have the same meaning and are used to refer to the largest dimension of a particle (or agglomerate thereof). In this context, "agglomeration" refers to a weak association between particles which may be held together by charge or polarity and can be broken down into smaller entities.

In a first aspect, a coating composition is provided. The coating composition comprises:
A) a plurality of silica nanoparticles functionalized with:
   i) a compound comprising a poly(ethyleneoxy) segment containing at least one hydroxyl group, at least one functional silane, and optionally a hydrophobic group, wherein the compound comprises a molecular weight ranging from 500 grams per mole to 13,000 grams per mole, inclusive;
   ii) an alkenyl silane; and
   iii) a dispersing agent;
B) a first multifunctional (meth)acrylate monomer; and
C) a second multifunctional (meth)acrylate monomer.

In a second aspect, another coating composition is provided. The coating composition comprises:
A) a first plurality of silica nanoparticles functionalized with:
   i) a compound comprising a poly(ethyleneoxy) segment containing at least one hydroxyl group, at least one functional silane, and optionally a hydrophobic group, wherein the compound comprises a molecular weight ranging from 500 grams per mole to 13,000 grams per mole, inclusive; and
   ii) a dispersing agent;
B) a second plurality of silica nanoparticles functionalized with:
   i) an alkenyl silane; and
   ii) the dispersing agent;
C) a first multifunctional (meth)acrylate monomer; and
D) a second multifunctional (meth)acrylate monomer.

The below disclosure relates to both the first aspect and the second aspect.

Silica nanoparticles of the present invention can be porous or nonporous, spherical and/or nonspherical. In some embodiments, the nanoparticles consist solely of only silica. Silica can be preferred nanoparticles, particularly silica nanoparticles derived from a silicate, such as an alkali metal silicate or ammonium silicate. Herein, "silica nanoparticles" refer to nanoparticles that include only silica as well as to core-shell nanoparticles with a surface that includes silica.

The silica nanoparticles (prior to functionalization) are typically provided as a dispersion rather than as a powder. Preferred dispersion generally contain from 15 wt-% to 50 wt-% of colloidal particles dispersed in a fluid medium. Representative examples of suitable fluid media for the colloidal particles include water, aqueous alcohol solutions, lower aliphatic alcohols, ethylene glycol, methoxypropanol, N,N-dimethylacetamide, formamide, or combinations thereof. The preferred fluid medium is aqueous, e.g., water and optionally one or more alcohols. Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del.), NYACOL (available from Nyacol Co., Ashland, Mass.) or NALCO (manufactured by Nalco Chemical Co., Naperville, Ill.). Useful silica dispersions include "NALCO 1115", "NALCO 2327", and "DVSZN004", each available from Nalco Chemical Company.

When used for optical applications, the silica nanoparticles typically have an average diameter of 120 nanometers or less. In many embodiments, the silica nanoparticles have an average diameter of at least 4 nanometers, at least 5 nanometers, at least 6 nanometers, at least 8 nanometers, at least 10 nanometers, at least 12 nanometers, at least 14 nanometers, or at least 16 nanometers, and up to 120 nanometers, up to 110 nanometers, up to 100 nanometers, up to 90 nanometers, up to 80 nanometers, up to 70 nanometers, up to 60 nanometers, up to 50 nanometers, up to 40 nanometers, up to 30 nanometers, or up to 20 nanometers. In certain embodiments, the silica nanoparticles have an average diameter of between 4 nanometers and 120 nanometers, inclusive, or between 4 nanometers and 45 nanometers, inclusive. In certain embodiments, the silica nanoparticles have an average diameter of 20 nanometers. In some embodiments, silica nanoparticles having more than one average diameter are employed, for instance and without limitation a mix of a plurality of silica nanoparticles having an average diameter of 75 nanometers and a plurality of silica nanoparticles having an average diameter of 20 nanometers. Any number of combinations of average silica nanoparticle diameters may be suitable. In embodiments having two sets (e.g., groups) of functionalized silica nanoparticles, often one set of silica nanoparticles will have a different average diameter than the other set of silica nanoparticles.

Average particle size of the silica nanoparticles can be measured using transmission electron microscopy. In practice, particle size may be determined using any suitable technique. Particle size refers to the number average particle size and is measured using an instrument that uses transmission electron microscopy or scanning electron microscopy. Another method to measure particle size is dynamic light scattering that measures weight average particle size. One example of such an instrument found to be suitable is the N4 PLUS SUB-MICRON PARTICLE ANALYZER available from Beckman Coulter Inc. of Fullerton, Calif. The nanoparticles may be relatively uniform in size. Uniformly sized nanoparticles generally provide more reproducible results. Preferably, variability in the size of the nanoparticles is less than 25% of the mean particle size.

The silica nanoparticles preferably have a surface area of at least 10 $m^2$/gram, more preferably at least 20 $m^2$/gram, and even more preferably at least 25 $m^2$/gram. The silica nanoparticles preferably have a surface area of greater than 750 $m^2$/gram.

In many embodiments, silica nanoparticles are functionalized by covalent bonding between the compound and the silica nanoparticles (as opposed to ionic bonding or attachment through strong physisorption). As noted above, the compound bound to the silica nanoparticles includes each of 1) a poly(ethyleneoxy) segment containing at least one hydroxyl group, 2) at least one functional silane, and 3) optionally a hydrophobic group. Each of 1) through 3) are described in further detail below: 1) In certain embodiments of the compound, the poly(ethyleneoxy) segment comprises a polyethylene oxide containing at least one polyethylene polyether chain. Further, in some embodiments, the compound comprises a polyethylene oxide segment having at least one group selected from a phenol, a propoxy, an ester, an aminopolyol, an oil, a quaternary ammonium, or a combination thereof. In an embodiment, the compound comprises an ethoxylated ester. The compound optionally comprises a branched polyethylene oxide containing at least two hydroxyl groups. In certain embodiments, the compound includes at least one furanose ring and/or at least one pyranose ring, and the poly(ethyleneoxy) segment is hydroxyl terminated.

2) In certain embodiments of the compound, the functional silane may be of the following Formula II:

$$R^1{}_n\text{—Si—}R^2{}_p\text{-L-}R^3{}_r \qquad\qquad \text{II}$$

wherein $R^1$ is a C1-C20 alkoxy, a C6-C20 aryloxy, a halogen, or OH;
$R^2$ is a hydrolyzable group;
L is a divalent linker;
$R^3$ is an amine, a halogen, an ester, or a sulfonate; and
p is 1-2, r is 1-3, and n is 3-p.

The hydrolyzable group preferably comprises an alkoxy having a 1 to 4 carbon atoms, an alkanoyloxy having 2 to 4 carbon atoms, a halide, an amide, a carbamate, a urea, an amidine, or a halide. $R^3$ is typically a group that is reactive with hydroxyl groups, such as an amine. Often, the divalent linker is an alkylene, an arylene, an aralkylene, a heteroalkylene, a heteroarylene, or a heteroaralkylene. In an embodiment, each of $R^1$ and $R^2$ are ethoxy, p is 2, n is 1, L is an alkylene, and $R^3$ is an amine.

3) In certain embodiments of the compound, the optional hydrophobic group comprises an aliphatic group, (i.e., a linear, branched, or cyclic, substituted or unsubstituted, nonpolar hydrocarbon having approximately 4 to 20 carbon atoms). Suitable aliphatic groups include for instance and without limitation, C7-C32 (and more preferably C9-C18) linear or branched alkyl or alkenyl groups. In many embodiments the compound including items 1), 2), and 3) is a silane-functionalized surfactant that has been covalently attached to the silica nanoparticles, thus rendering it technically no longer a surfactant following covalent bonding to the silica nanoparticles. Accordingly, the compound can be prepared by silane functionalization of a commercially available surfactant, for instance and without limitation, ethoxylated alcohols available under the trade names BRIJ L23, DEHYDOL LT 5, LUTENSOL AT 11, and TERGITOL TMN 10; ethoxylated phenols available under the trade names TRITON X-100, IGEPAL CO-630, and TERGITOL NP-9; ethoxylated propoxylated alcohols available under the trade names PLURONIC F127 and ECOSURF EH-3; ethoxylated esters available under the trade names TWEEN 20, TWEEN 80, and TWEEN 85; aminopolyol amine ethoxylates available under the trade names PLURIOL A 21 and LUTENSOL FA 12; ethoxylated vegetable oils available under the trade name ETOCAS 40-SS; and/or quaternary ammonium compounds available under the trade names ETHOQUAD C/12 and CRODAQUAT 1207-LQ. TERGITOL TMN 10, TERGITOL NP-9, ECOSURF EH-3, TRITON X-100 are available from The Dow Chemical Company, Midland, Mich.; LUTENSOL AT 11, LUTENSOL FA 12, PLURONIC F127, and PLURIOL A 21 are available from BASF Corporation (Ludwigshafen, Germany); BRIJ L23, ETOCAS 40-SS, CRODAQUAT 1207-LQ, TWEEN 20, TWEEN 80, and TWEEN 85 are available from Croda International Plc, (East Yorkshire, UK); DEHYDOL LT 5 is available from Cospha (Bucharest, Romania); IGEPAL CO-630 is available from Rhodia (Paris, France); and ETHOQUAD C/12 is available from AkzoNobel (Chicago, Ill.).

In certain embodiments, the compound comprises a molecular weight of at least 500 grams per mole (g/mol), at least 600 g/mol, at least 700 g/mol, at least 800 g/mol, at least 900 g/mol, or at least 1,000 g/mol, and up to 25,000 g/mol, up to 20,000 g/mol, up to 18,000 g/mol, up to 15,000 g/mol, up to 13,000 g/mol, up to 12,000 g/mol, up to 10,000 g/mol, up to 8,000 g/mol, up to 6,000 g/mol, up to 4,000 g/mol, up to 3,000 g/mol, or up to 2,000 g/mol. Stated another way, the compound optionally comprises a molecular weight ranging from 500 g/mol to 25,000 g/mol, ranging from 500 g/mol to 13,000 g/mol, ranging from 700 g/mol to 4,000, or ranging from 900 g/mol to 2,000 g/mol, each range being inclusive.

In addition to the compound, at least some of the silica nanoparticles are functionalized with a dispersing agent. Typically, the dispersing agent comprises at least one of a polyethyleneoxide alkoxysilane, a hydroxycarbonyl alkyl trialkoxysilane, a zwitterionic alkoxysilane, or an acrylic alkoxysilane. In select embodiments, the dispersing agent comprises a polyethyleneoxide silane, for instance a polyethylene glycol (PEG). Dispersing agents include monovalent groups that are capable of providing compatibilizing characteristics to the nanoparticle surface, thereby reducing, and preferably preventing, excessive agglomeration and precipitation of the nanoparticles in an aqueous coating solution. Such dispersing agents can be represented by the formula A-L-D, wherein A are the surface-bonding groups (i.e. for bonding to the silica nanoparticle surface), D represents the dispersible groups (e.g., water dispersible groups), and L represents an organic linker or a bond. Organic linkers L can be linear or branched alkylene, arylene, or a combination of alkylene and arylene groups, optionally including heteroatoms. Dispersible groups typically include, for example, nonionic groups, anionic groups, cationic groups, groups that are capable of forming an anionic group or cationic group when dispersed in water (e.g., salts or acids), or mixtures thereof.

Examples of nonionic water-dispersible groups include polyalkylene oxide (e.g. PEG) groups. One illustrative silane surface treatment for use with silica nanoparticles is a polyethylene oxide (PEG) silane, such as 3-[methoxy(polyethyleneoxy)propyl]trimethoxysilane.

Moreover, in addition to the compound and the dispersing agent, at least some of the silica nanoparticles are functionalized with an alkenyl silane. The alkenyl silane is not particularly limited, and exemplary alkenyl silanes include acryloxypropyl trialkoxysilanes and methacryloxypropyl trialkoxysilanes. Ethylenically unsaturated silanes such as vinyl trialkoxy silanes may also be used. For example, the alkenyl silane may comprise 3-(trimethoxysilyl)propyl methacrylate. In at least certain embodiments, the alkenyl silane provides further covalent binding between silica nanoparticles and multifunctional (meth)acrylate monomers during polymerization of the coating composition.

As noted above, in the first aspect a plurality of silica nanoparticles is functionalized with each of an alkenyl silane, a dispersing agent, and a compound (i.e., a compound comprising a poly(ethyleneoxy) segment containing at least one hydroxyl group, at least one functional silane, and optionally a hydrophobic group). In certain embodiments of the first aspect, a coverage ratio over the plurality of silica nanoparticles of the compound to the combined dispersing agent and alkenyl silane is 10:90, or 20:80, or 30:70, or 40:60, or 50:50, such as 10:90 to 50:50, inclusive. In certain embodiments of the first aspect, a coverage ratio over the plurality of silica nanoparticles of the compound to the dispersing agent to the alkenyl silane is 20:40:20 to 30:30:20, inclusive. In contrast, in the second aspect comprising two sets of silica nanoparticles, in certain embodiments a coverage ratio over the first plurality of silica nanoparticles of the compound to the dispersing agent is 10:90, or 20:80, or 30:70, or 40:60, or 50:50, such as 10:90 to 50:50, inclusive. In certain embodiments, a coverage ratio over the second plurality of silica nanoparticles of the dispersing agent to the alkenyl silane is 70:30 to 60:40, inclusive.

The attachment procedure or reaction conditions required to functionalize the silica nanoparticles with the above-described groups depends on the particular groups being used. For silanes, it can be preferred to surface treat at elevated temperatures under acidic or basic conditions for approximately 1-24 hours. Exemplary suitable methods for attaching groups to silica nanoparticles are described in the Examples below.

As noted above, the coating composition includes a first multifunctional (meth)acrylate monomer and a second multifunctional (meth)acrylate monomer. Generally speaking, the first multifunctional (meth)acrylate provides a hydrophobic character to the composition and the second multifunctional (meth)acrylate provides a compatibilizing character to the composition to promote the compatibility of the first multifunctional (meth)acrylate monomer and the plurality of functionalized silica nanoparticles. It has been discovered that the combination of the first multifunctional (meth)acrylate with the second multifunctional (meth)acrylate and the plurality of functionalized silica nanoparticles contributes to the achievement of a long-lasting anti-fog coating composition.

In certain embodiments, the first multifunctional (meth)acrylate monomer included in the coating composition comprises a multifunctional aliphatic acrylate, a multifunctional urethane acrylate, a multifunctional polyether acrylate, a multifunctional polyester acrylate, a multifunctional epoxy acrylate, or a combination thereof. In select embodiments, the first multifunctional (meth)acrylate monomer comprises a multifunctional aliphatic urethane acrylate. The number of functionalities of the first multifunctional (meth)acrylate monomer is not particularly limited, for instance and without limitation including 3 (meth)acrylate functionalities, 4 (meth)acrylate functionalities, 5 (meth)acrylate functionalities, 6 (meth)acrylate functionalities, 7 (meth)acrylate functionalities, 8 (meth)acrylate functionalities, 9 (meth)acrylate functionalities, 10 (meth)acrylate functionalities, 11 (meth)acrylate functionalities, or even 12 (meth)acrylate functionalities. In certain embodiments, the first multifunctional (meth)acrylate monomer comprises 6 to 10 (meth)acrylate functionalities, inclusive, such as 10 (meth)acrylate functionalities. An advantage to employing a large number of (meth)acrylate functionalities is the possibility for greater networking (e.g., crosslinking) between monomers during polymerization of the composition.

Useful multifunctional (meth)acrylate monomers include for instance and without limitation, dipentaerythritol pentaacrylate (SARTOMER SR415 (Sartomer, Exton, Pa.)), ethoxylated pentaerythritol tetraacrylate (SARTOMER SR494), polyethylene glycol 600 diacrylate (SARTOMER SR610), ethoxylated bisphenol A diacrylate (SARTOMER SR285), 10-functional urethane acrylate (EBECRYL 8415 (Allnex, Wallingford, Conn.), and an aliphatic urethane acrylate (EBECRYL 8210).

In many embodiments, the second multifunctional (meth)acrylate monomer is of the following Formula I:

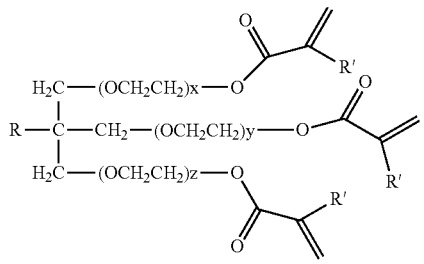

wherein R is a C1-C6 alkyl group, acryloyl, or vinyl;
R' is methyl or H; and
x, y, and z are independently an integer of at least 1.

Often, R is $CH_3CH_2$. The second multifunctional (meth)acrylate monomer, for instance and without limitation, is optionally selected from the group consisting of bifunctional acrylate monomers derived from ethyleneglycol or polyethylene glycol, and polyfunctional acrylate monomers derived from ethyleneoxide, polyethyleneoxide, or polybutyleneoxide.

The coating composition is not limited to two multifunctional (meth)acrylate monomers. Rather, it is contemplated that the coating composition may comprise a third multifunctional (meth)acrylate monomer, a fourth multifunctional (meth)acrylate monomer, a fifth multifunctional (meth)acrylate monomer, a sixth multifunctional (meth)acrylate monomer, and so on. Such additional multifunctional (meth)acrylate monomers optionally include any one or more multifunctional (meth)acrylate monomers disclosed in detail above, as well as (meth)acrylic acid and/or zwitterionic acrylic monomers.

Typically, for achievement of both anti-fog and mechanical durability properties, the plurality of functionalized silica nanoparticles are present at a relatively high loading in the coating composition. For instance, a plurality of functionalized silica nanoparticles may be present in an amount of at least 40% by weight of the total coating composition, at least 50% by weight, at least 60% by weight, or at least 70% by weight of the total coating composition. Moreover, in certain embodiments, a weight ratio of the plurality of silica nanoparticles functionalized with the compound to the combined total of all of the multifunctional acrylate monomers present in the coating composition is between 40/60 and 80/20, inclusive.

To achieve mechanical durability of such coatings, especially abrasion resistance after being soaked in water, the tested coatings must show minimal or no swelling upon soaking in water. It has surprisingly been discovered that a preferred content of ethyleneoxide multifunctional acrylate monomers in the total weight of the (meth)acrylate multifunctional monomers is in the range of 15% to 55%, inclusive. For example, in select embodiments, the coating composition comprises at least one ethyleneoxide multifunctional acrylate monomer that is present in an amount of 15% to 55% by weight of the combined weight of the first multifunctional (meth)acrylate monomer and the second multifunctional (meth)acrylate monomer. In certain embodiments, a weight ratio of the first multifunctional (meth)acrylate monomer to the second multifunctional (meth)acrylate monomer is between 80/20 and 20/80, inclusive, such as between 80/20 and 60/40. In select embodiments, the second multifunctional (meth)acrylate monomer is present in coating compositions according to the present disclosure in an amount of less than 40% by weight of the total coating composition, or less than 35% by weight, and greater than 20% by weight, or greater than 25% by weight of the total coating composition.

The level of coverage of the inorganic nanoparticles herein is reported in terms of the concentration of functional groups in the coating composition, assuming 100% of the amount of functional groups of the surface treatment would be covalently bonded to surface of the silica particles. In some embodiments, the inorganic nanoparticles comprise a surface treatment at 25% or 50% coverage.

In many embodiments, the coating composition further comprises a photoinitiator. Useful photoinitiators include benzoin ethers such as benzoin methyl ether and benzoin isopropyl ether; substituted acetophenones such as 2,2-dimethoxyacetophenone, available as IRGACURE 651 photoinitiator (Ciba Specialty Chemicals, Tarrytown, N.Y.); 2,2 dimethoxy-2-phenyl-1-phenylethanone, available as ESACURE KB-1 photoinitiator (Sartomer, Exton, Pa.); and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Additional suitable photoinitiators include 1-hydroxy cyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one, available as IRGACURE 2959; 2-benzyl-2-dimethylamino-1-(4-morpholinophenyl) butanone, available as IRGACURE 369; 2-methyl-1-[4-(methylthio)phenyl]-2-morpholinopropan-1-one, available as IRGACURE 907; and 2-hydroxy-2-methyl-1-phenyl propan-1-one, available as DAROCUR 1173 (Ciba Specialty Chemicals, Tarrytown, N.Y.).

In a third aspect, an article is provided. The article comprises a substrate and a coating, wherein the coating comprises the cured reaction product of a coating composition of the first aspect or the second aspect. Referring to FIG. 1, an article 100 is shown that comprises a substrate 120 having a layer 110 disposed thereon. Layer 110 is formed by applying a composition according to the present disclosure to a surface of a substrate 120 and at least partially drying the composition.

Coating compositions can be supplied in liquid form (e.g., in a pourable form or sprayable form) or impregnated into an applicator substrate (e.g., forming an applicator pad or wipe). Suitable applicator substrates can be in the form of a sponge, foam, woven, nonwoven, or knit material, for example. The term "nonwoven web" or "nonwoven fabric" refers to a web or fabric having a structure of individual fibers that are interlaid in an irregular manner. In contrast, knit or woven fabrics have fibers that are interlaid in a regular manner. The coating composition typically further includes a solvent comprising an alcohol, a ketone, or tetrahydrofuran.

The liquid coating compositions can be applied by conventional methods, including spraying, spin coating, brushing, dipping, flow coating, etc., but typically are applied by spin coating or spraying. The coating operation can be conducted either in a single stage or by a multiple stage coating procedure, as is well known in the art. The conditions adopted for curing the coating composition can vary. In some embodiments, the coating is thermally cured at a temperature from about 90 to 120° C. for about 20 minutes. Generally, lower temperatures require longer cure times. Infrared heating can be used to shorten the time until the coating can be handled. In certain embodiments, the coating composition may be cured using UV irradiation.

Suitable substrates may include, for example, glass (for example, windows) and optical elements such as, for example, lenses, filters, and mirrors), thermosetting polymers, sheet molding compound, thermoplastics (for example, polycarbonate, acrylics, polyolefins, polyurethanes, polyesters (e.g., polyethylene terephthalate (PET), polybutyleneterephthalate), polyamides, polyimides, phenolic resins, cellulose diacetate, cellulose triacetate, polystyrene (e.g., allyldiglycolcarbonatepolystyrene), and styrene-acrylonitrile copolymers), polyacrylates such as polymethylmethacrylate, polysulfone, polyethersulfone, cellulose acetate butyrate, glass, and the like, including blends and laminates thereof. Typically the substrate is in the form of a film, sheet, panel or pane of material and is part of an article. The substrate may be flat, curved or shaped. The article to be coated may be produced by blowing, casting, extrusion, or injection molding. In certain embodiments, the article comprises a window film or a face shield.

Anti-fog coating compositions may be coated on both sides of the substrate. Alternatively, the coatings of the present invention may be coated on one side of the substrate. The opposite side of the substrate may be uncoated or coated with a wide variety of conventional anti-fogging compositions. Preferably, the coating surface should face the direction of higher humidity, e.g., on a face shield the side having the anti-fog coating should face the wearer.

The dried and cured coating compositions described herein can exhibit high transparency, greater than 90% and thus are suitable for application to a variety of light transmissive substrates and articles. Hence, in at least certain embodiments, the substrate comprises a visible light transparent material. Such highly transparent compositions are typically substantially free of opacifiying pigments (i.e. less than 0.5 or 0.1 wt-%)

The coating compositions can provide anti-fog properties to substrates coated and dried and cured thereon. Dried and cured coatings are considered to have "good" or "excellent" anti-fogging properties if a coated substrate resists the formation of small, condensed water droplets in sufficient density to significantly reduce the transparency of the coated substrate such that it cannot be adequately seen through, according to the test method described in the Examples.

In some embodiments, the dried and cured coating compositions are sufficiently durable that such that good or excellent anti-fog characteristics are provided initially and after being soaked in 50° C. water for 24 hours. In other embodiments, the dried and cured coating compositions are sufficiently durable that they can provide good or excellent anti-fog characteristics after being soaked in 65° C. water for 120 hours.

Advantageously, the article exhibits relatively low optical haze, despite the high loading of silica nanoparticles in the cured coating composition. In certain embodiments, the article comprises an average optical haze of less than 6%, less than 5%, less than 4%, less than 3%, less than 2%, less than 1%, or less than 0.5%. Moreover, due to mechanical durability of the cured coating composition, the article often exhibits a change in average optical haze of less than 12% following abrasion with CS-10F abrading wheels (available from Taber Industries, North Tonawanda, N.Y.) under 500 grams load for 100 cycles, such as less than 10%, less than 9%, less than 8%, less than 7%, less than 6%, or less than 5% change in average optical haze following abrasion with CS-10F abrading wheels under 500 grams load for 100 cycles. Similarly, in certain embodiments, the article has an average optical transmission of at least 90%. The article exhibits a change in average optical transmission of less than 1.5% following abrasion with CS-10F abrading wheels under 500 grams load for 100 cycles, such as less than 1.4%, less than 1.3%, less than 1.2%, less than 1.1%, or less than 1.0% change in average optical transmission following abrasion with CS-10F abrading wheels under 500 grams load for 100 cycles. Exemplary procedures for performing such tests of the difference in optical haze and optical transmission are described in the Examples below.

Exemplary Items:

Item 1 is a coating composition including a plurality of functionalized silica nanoparticles, a first multifunctional (meth)acrylate monomer, and a second multifunctional (meth)acrylate monomer. The silica nanoparticles are functionalized with an alkenyl silane, a dispersing agent, and a compound comprising a poly(ethyleneoxy) segment containing at least one hydroxyl group, at least one functional silane, and optionally a hydrophobic group. The compound has a molecular weight ranging from 500 grams per mole to 25,000 grams per mole, inclusive.

Item 2 is the coating composition of item 1, wherein the compound has a molecular weight ranging from 900 grams per mole to 2,000 grams per mole, inclusive.

Item 3 is the coating composition of item 1 or item 2, wherein the first multifunctional (meth)acrylate monomer includes 6 to 10 acrylate functionalities, inclusive.

Item 4 is the coating composition of any of items 1 to 3, wherein the first multifunctional (meth)acrylate monomer includes 10 acrylate functionalities.

Item 5 is the coating composition of any of items 1 to 4, wherein the silica nanoparticles are functionalized by covalent bonding between the compound and the silica nanoparticles.

Item 6 is the coating composition of any of items 1 to 5, wherein the poly(ethyleneoxy) segment comprises a polyethylene oxide containing at least one polyethylene polyether chain.

Item 7 is the coating composition of any of items 1 to 6, wherein the compound comprises a polyethylene oxide segment having at least one group selected from a phenol, a propoxy, an ester, an aminopolyol, an oil, a quaternary ammonium, or a combination thereof.

Item 8 is the coating composition of any of items 1 to 7, wherein the compound comprises an ethoxylated ester.

Item 9 is the coating composition of any of items 1 to 7, wherein the compound comprises a branched polyethylene oxide containing at least two hydroxyl groups.

Item 10 is the coating composition of any of items 1 to 9, wherein the dispersing agent comprises at least one of a polyethyleneoxide alkoxysilane, a hydroxycarbonyl alkyl trialkoxysilane, a zwitterionic alkoxysilane, or an acrylic alkoxysilane.

Item 11 is the coating composition of any of items 1 to 10, wherein the dispersing agent comprises a polyethyleneoxide silane.

Item 12 is the coating composition of any of items 1 to 11, wherein the dispersing agent comprises a polyethylene glycol.

Item 13 is the coating composition of any of items 1 to 12, wherein the alkenyl silane comprises 3-(trimethoxysilyl) propyl methacrylate.

Item 14 is the coating composition of any of items 1 to 13, wherein a coverage ratio over the plurality of silica nanoparticles of the compound to the combined dispersing agent and alkenyl silane is 10:90 to 50:50, inclusive.

Item 15 is the coating composition of any of items 1 to 14, wherein a coverage ratio over the plurality of silica nanoparticles of the compound to the dispersing agent to the alkenyl silane is 20:40:20 to 30:30:20, inclusive.

Item 16 is the coating composition of any of items 1 to 15, wherein the first multifunctional (meth)acrylate monomer comprises a multifunctional aliphatic acrylate, a multifunctional urethane acrylate, a multifunctional polyether acrylate, a multifunctional polyester acrylate, a multifunctional epoxy acrylate, or a combination thereof.

Item 17 is the coating composition of any of items 1 to 16, wherein the first multifunctional (meth)acrylate monomer comprises a multifunctional aliphatic urethane acrylate.

Item 18 is the coating composition of any of items 1 to 17, wherein the second multifunctional (meth)acrylate monomer is of the following Formula I:

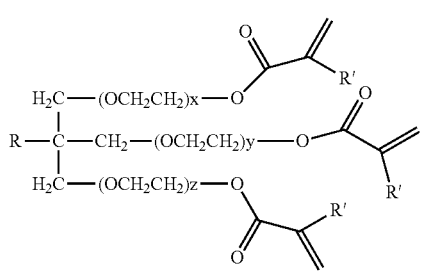

wherein R is a C1-C6 alkyl group, acryloyl, or vinyl;
R' is methyl or H; and
x, y, and z are independently an integer of at least 1.

Item 19 is the coating composition of item 18, wherein R is $CH_3CH_2$.

Item 20 is the coating composition of item 18, wherein the second multifunctional (meth)acrylate monomer is selected from the group consisting of bifunctional acrylate monomers derived from ethyleneglycol or polyethylene glycol, and polyfunctional acrylate monomers derived from ethyleneoxide, polyethyleneoxide, or polybutyleneoxide.

Item 21 is the coating composition of any of items 17 to 20, including at least one ethyleneoxide multifunctional acrylate monomer present in an amount of 15% to 55% by weight of the combined weight of the first multifunctional (meth)acrylate monomer and the second multifunctional (meth)acrylate monomer.

Item 22 is the coating composition of any of items 1 to 21, wherein the functional silane is of the following Formula II:

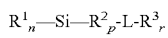

wherein $R^1$ is a C1-C20 alkoxy, a C6-C20 aryloxy, a halogen, or OH;
$R^2$ is a hydrolyzable group;
L is a divalent linker;
$R^3$ is an amine, a halogen, an ester, or a sulfonate; and
p is 1-2, r is 1-3, and n is 3-p.

Item 23 is the coating composition of item 22, wherein the hydrolyzable group comprises an alkoxy having 1 to 4 carbon atoms, an alkanoyloxy having 2 to 4 carbon atoms, a halide, an amide, a carbamate, a urea, an amidine, or a halide.

Item 24 is the coating composition of item 22 or item 23, wherein $R^3$ is an amine.

Item 25 is the coating composition of any of items 22 to 24, wherein the divalent linker is an alkylene, an arylene, an aralkylene, a heteroalkylene, a heteroarylene, or a heteroaralkylene.

Item 26 is the coating composition of any of items 22 to 25, wherein each of $R^1$ and $R^2$ are each ethoxy, p is 2, n is 1, L is an alkylene, and $R^3$ is an amine.

Item 27 is the coating composition of any of items 1 to 26, further including a third multifunctional acrylate monomer.

Item 28 is the coating composition of any of items 1 to 27, further including a fourth multifunctional acrylate monomer.

Item 29 is the coating composition of any of items 1 to 28, wherein the plurality of silica nanoparticles functionalized with the compound are present in an amount of at least 40% by weight of the total coating composition.

Item 30 is the coating composition of any of items 1 to 29, wherein the plurality of silica nanoparticles functionalized with the compound are present in an amount of at least 60% by weight of the total coating composition.

Item 31 is the coating composition of any of items 1 to 30, wherein a weight ratio of the plurality of silica nanoparticles functionalized with the compound to the combined total of all of the multifunctional acrylate monomers present in the coating composition is between 40/60 and 80/20, inclusive.

Item 32 is the coating composition of any of items 1 to 31, wherein a weight ratio of the first multifunctional (meth) acrylate monomer to the second multifunctional (meth) acrylate monomer is between 80/20 and 20/80, inclusive.

Item 33 is the coating composition of any of items 1 to 32, further including a solvent comprising an alcohol, a ketone, or tetrahydrofuran.

Item 34 is a coating composition including a first multifunctional (meth)acrylate monomer, a second multifunctional (meth)acrylate monomer, a first plurality of functionalized silica nanoparticles, and a second plurality of functionalized silica nanoparticles. The first plurality of silica nanoparticles are functionalized with a dispersing agent and a compound comprising a poly(ethyleneoxy) segment containing at least one hydroxyl group, at least one functional silane, and optionally a hydrophobic group. The compound has a molecular weight ranging from 500 grams per mole to 25,000 grams per mole, inclusive. The second plurality of silica nanoparticles is functionalized with an alkenyl silane and the dispersing agent.

Item 35 is the coating composition of item 34, wherein the compound comprises a molecular weight ranging from 900 grams per mole to 2,000 grams per mole, inclusive.

Item 36 is the coating composition of item 34 or item 35, wherein the first multifunctional (meth)acrylate monomer includes 6 to 10 acrylate functionalities, inclusive.

Item 37 is the coating composition of any of items 34 to 36, wherein the first multifunctional (meth)acrylate monomer includes 10 acrylate functionalities.

Item 38 is the coating composition of any of items 34 to 37, wherein the first plurality of silica nanoparticles are functionalized by covalent bonding between the compound and the silica nanoparticles.

Item 39 is the coating composition of any of items 34 to 38, wherein the poly(ethyleneoxy) segment comprises a polyethylene oxide containing at least one polyethylene polyether chain.

Item 40 is the coating composition of any of items 34 to 39, wherein the compound comprises a polyethylene oxide segment having at least one group selected from a phenol, a propoxy, an ester, an aminopolyol, an oil, a quaternary ammonium, or a combination thereof.

Item 41 is the coating composition of any of items 34 to 40, wherein the compound comprises an ethoxylated ester.

Item 42 is the coating composition of any of items 34 to 41, wherein the compound comprises a branched polyethylene oxide containing at least two hydroxyl groups.

Item 43 is the coating composition of any of items 34 to 42, wherein the dispersing agent comprises at least one of a polyethyleneoxide alkoxysilane, a hydroxycarbonyl alkyl trialkoxysilane, a zwitterionic alkoxysilane, or an acrylic alkoxysilane.

Item 44 is the coating composition of any of items 34 to 43, wherein the dispersing agent comprises a polyethyleneoxide silane.

Item 45 is the coating composition of any of items 34 to 44, wherein the dispersing agent comprises a polyethylene glycol.

Item 46 is the coating composition of any of items 34 to 45, wherein the alkenyl silane comprises 3-(trimethoxysilyl) propyl methacrylate.

Item 47 is the coating composition of any of items 34 to 46, wherein a coverage ratio over the first plurality of silica nanoparticles of the compound to the dispersing agent is 10:90 to 50:50, inclusive.

Item 48 is the coating composition of any of items 34 to 47, wherein a coverage ratio over the second plurality of silica nanoparticles of the dispersing agent to the alkenyl silane is 70:30 to 60:40, inclusive.

Item 49 is the coating composition of any of items 34 to 48, wherein the first multifunctional (meth)acrylate monomer comprises a multifunctional aliphatic acrylate, a multifunctional urethane acrylate, a multifunctional polyether acrylate, a multifunctional polyester acrylate, a multifunctional epoxy acrylate, or a combination thereof.

Item 50 is the coating composition of any of items 34 to 49, wherein the first multifunctional (meth)acrylate monomer comprises a multifunctional aliphatic urethane acrylate.

Item 51 is the coating composition of any of items 34 to 50, wherein the second multifunctional (meth)acrylate monomer is of the following Formula I:

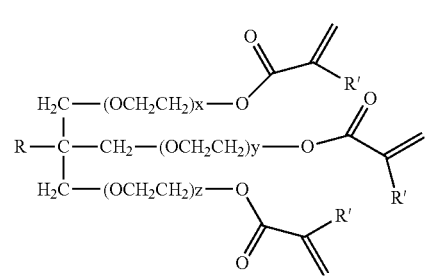

wherein R is a C1-C6 alkyl group, acryloyl, or vinyl;
R' is methyl or H; and
x, y, and z are independently an integer of at least 1.

Item 52 is the coating composition of item 51, wherein R is $CH_3CH_2$.

Item 53 is the coating composition of item 51, wherein the second multifunctional (meth)acrylate monomer is selected from the group consisting of bifunctional acrylate monomers derived from ethyleneglycol or polyethylene glycol, and polyfunctional acrylate monomers derived from ethyleneoxide, polyethyleneoxide, or polybutyleneoxide.

Item 54 is the coating composition of any of items 50 to 53, comprising at least one ethyleneoxide multifunctional acrylate monomer present in an amount of 15% to 55% by weight of the combined weight of the first multifunctional (meth)acrylate monomer and the second multifunctional (meth)acrylate monomer.

Item 55 is the coating composition of any of items 34 to 54, wherein the functional silane is of the following Formula II:

  II wherein $R^1$ is a C1-C20 alkoxy, a C6-C20 aryloxy, a halogen, or OH;
$R^2$ is a hydrolyzable group;
L is a divalent linker;
$R^3$ is an amine, a halogen, an ester, or a sulfonate; and
p is 1-2, r is 1-3, and n is 3-p.

Item 56 is the coating composition of item 55, wherein the hydrolyzable group comprises an alkoxy having 1 to 4 carbon atoms, an alkanoyloxy having 2 to 4 carbon atoms, a halide, an amide, a carbamate, a urea, an amidine, or a halide.

Item 57 is the coating composition of item 55 or item 56, wherein $R^3$ is an amine.

Item 58 is the coating composition of any of items 55 to 57, wherein the divalent linker is an alkylene, an arylene, an aralkylene, a heteroalkylene, a heteroarylene, or a heteroaralkylene.

Item 59 is the coating composition of any of items 55 to 58, wherein each of $R^1$ and $R^2$ are each ethoxy, p is 2, n is 1, L is an alkylene, and $R^3$ is an amine.

Item 60 is the coating composition of any of items 34 to 59, further including a third multifunctional acrylate monomer.

Item 61 is the coating composition of any of items 34 to 60, further including a fourth multifunctional acrylate monomer.

Item 62 is the coating composition of any of items 34 to 61, wherein the combined first and second plurality of silica nanoparticles functionalized with the compound are present in an amount of at least 40% by weight of the total coating composition.

Item 63 is the coating composition of any of items 34 to 62, wherein the combined first and second plurality of silica nanoparticles functionalized with the compound are present in an amount of at least 60% by weight of the total coating composition.

Item 64 is the coating composition of any of items 34 to 63, wherein a weight ratio of the combined first and second plurality of silica nanoparticles functionalized with the compound to the combined total of all of the multifunctional acrylate monomers present in the coating composition is between 40/60 and 80/20, inclusive.

Item 65 is the coating composition of any of items 34 to 64, wherein a weight ratio of the first multifunctional (meth)acrylate monomer to the second multifunctional (meth)acrylate monomer is between 80/20 and 20/80, inclusive.

Item 66 is the coating composition of any of items 34 to 65, further including a solvent comprising an alcohol, a ketone, or tetrahydrofuran.

Item 67 is an article including a substrate and a coating. The coating comprises the cured reaction product of a coating composition of item 1 or item 34.

Item 68 is the article of item 67, wherein the substrate includes a polymeric material or a glass material.

Item 69 is the article of item 67 or item 68, wherein the substrate includes a visible light transparent material.

Item 70 is the article of any of items 67 to 69, wherein the article has an average optical haze of less than 5%.

Item 71 is the article of any of items 67 to 70, wherein the article has an average optical haze of less than 3%.

Item 72 is the article of any of items 67 to 71, wherein the article exhibits a change in average optical haze of less than 10% following abrasion with CS-10F abrading wheels under 500 grams load for 100 cycles.

Item 73 is the article of any of items 67 to 72, wherein the article exhibits a change in average optical haze of less than 7% following abrasion with CS-10F abrading wheels under 500 grams load for 100 cycles.

Item 74 is the article of any of items 67 to 73, wherein the article has an average optical transmission of at least 90%.

Item 75 is the article of any of items 67 to 74, wherein the article exhibits a change in average optical transmission of less than 1.5% following abrasion with CS-10F abrading wheels under 500 grams load for 100 cycles.

Item 76 is the article of any of items 67 to 75, wherein the silica nanoparticles have an average diameter of between 4 nanometers and 100 nanometers, inclusive.

Item 77 is the article of any of items 67 to 76, wherein the silica nanoparticles have an average diameter of between 4 nanometers and 45 nanometers, inclusive.

Item 78 is the article of any of items 67 to 77, wherein the silica nanoparticles have an average diameter of 20 nanometers.

Item 79 is the article of any of items 67 to 78, wherein article includes a window film or a face shield.

Item 80 is the article of any of items 67 to 79, wherein the compound has a molecular weight ranging from 900 grams per mole to 2,000 grams per mole, inclusive.

Item 81 is the article of any of items 67 to 80, wherein the first multifunctional (meth)acrylate monomer includes 6 to 10 acrylate functionalities, inclusive.

Item 82 is the article of any of items 67 to 81, wherein the first multifunctional (meth)acrylate monomer includes 10 acrylate functionalities.

Item 83 is the article of any of items 67 to 82, wherein the silica nanoparticles are functionalized by covalent bonding between the compound and the silica nanoparticles.

Item 84 is the article of any of items 67 to 83, wherein the poly(ethyleneoxy) segment comprises a polyethylene oxide containing at least one polyethylene polyether chain.

Item 85 is the article of any of items 67 to 84, wherein the compound comprises a polyethylene oxide segment having at least one group selected from a phenol, a propoxy, an ester, an aminopolyol, an oil, a quaternary ammonium, or a combination thereof.

Item 86 is the article of any of items 67 to 85, wherein the compound comprises an ethoxylated ester.

Item 87 is the article of any of items 67 to 85, wherein the compound comprises a branched polyethylene oxide containing at least two hydroxyl groups.

Item 88 is the article of any of items 67 to 87, wherein the dispersing agent comprises at least one of a polyethyleneoxide alkoxysilane, a hydroxycarbonyl alkyl trialkoxysilane, a zwitterionic alkoxysilane, or an acrylic alkoxysilane.

Item 89 is the article of any of items 67 to 88, wherein the dispersing agent comprises a polyethyleneoxide silane.

Item 90 is the article of any of items 67 to 89, wherein the dispersing agent comprises a polyethylene glycol.

Item 91 is the article of any of items 67 to 90, wherein the alkenyl silane comprises 3-(trimethoxysilyl)propyl methacrylate.

Item 92 is the article of any of items 67 to 91, wherein the first multifunctional (meth)acrylate monomer comprises a multifunctional aliphatic acrylate, a multifunctional urethane acrylate, a multifunctional polyether acrylate, a multifunctional polyester acrylate, a multifunctional epoxy acrylate, or a combination thereof.

Item 93 is the article of any of items 67 to 92, wherein the first multifunctional (meth)acrylate monomer comprises a multifunctional aliphatic urethane acrylate.

Item 94 is the article of any of items 67 to 93, wherein the second multifunctional (meth)acrylate monomer is of the following Formula I:

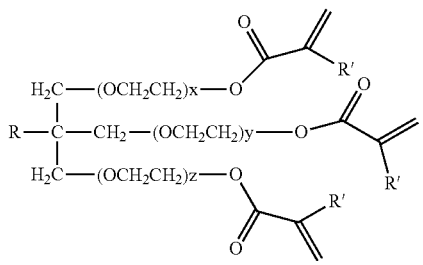

wherein R is a C1-C6 alkyl group, acryloyl, or vinyl;
R' is methyl or H; and
x, y, and z are independently an integer of at least 1.

Item 95 is the article of item 94, wherein R is $CH_3CH_2$.

Item 96 is the article of item 94, wherein the second multifunctional (meth)acrylate monomer is selected from the group consisting of bifunctional acrylate monomers derived from ethyleneglycol or polyethylene glycol, and polyfunctional acrylate monomers derived from ethyleneoxide, polyethyleneoxide, or polybutyleneoxide.

Item 97 is the article of any of items 93 to 96, the coating composition including at least one ethyleneoxide multifunctional acrylate monomer present in an amount of 15% to 55% by weight of the combined weight of the first multifunctional (meth)acrylate monomer and the second multifunctional (meth)acrylate monomer.

Item 98 is the article of any of items 67 to 97, wherein the functional silane is of the following Formula II:

$$R^1{}_n\text{—Si—}R^2{}_p\text{-L-}R^3{}_r \qquad \text{II}$$

wherein $R^1$ is a C1-C20 alkoxy, a C6-C20 aryloxy, a halogen, or OH;
$R^2$ is a hydrolyzable group;
L is a divalent linker;
$R^3$ is an amine, a halogen, an ester, or a sulfonate; and
p is 1-2, r is 1-3, and n is 3-p.

Item 99 is the article of item 98, wherein the hydrolyzable group comprises an alkoxy having 1 to 4 carbon atoms, an alkanoyloxy having 2 to 4 carbon atoms, a halide, an amide, a carbamate, a urea, an amidine, or a halide.

Item 100 is the article of item 98 or item 99, wherein $R^3$ is an amine.

Item 101 is the article of any of items 98 to 100, wherein the divalent linker is an alkylene, an arylene, an aralkylene, a heteroalkylene, a heteroarylene, or a heteroaralkylene.

Item 102 is the article of any of items 98 to 101, wherein each of $R^1$ and $R^2$ are each ethoxy, p is 2, n is 1, L is an alkylene, and $R^3$ is an amine.

Item 103 is the article of any of items 67 to 102, the coating composition further including a third multifunctional acrylate monomer.

Item 104 is the article of any of items 67 to 103, the coating composition further including a fourth multifunctional acrylate monomer.

Item 105 is the article of any of items 67 to 104, wherein the plurality of silica nanoparticles functionalized with the compound are present in an amount of at least 40% by weight of the article.

Item 106 is the article of any of items 67 to 105, wherein the plurality of silica nanoparticles functionalized with the compound are present in an amount of at least 60% by weight of the article.

Item 107 is the article of any of items 67 to 106, wherein a weight ratio of the plurality of silica nanoparticles functionalized with the compound to the combined total of all of the multifunctional acrylate monomers present in the coating composition is between 40/60 and 80/20, inclusive.

Item 108 is the article of any of items 67 to 107, wherein a weight ratio of the first multifunctional (meth)acrylate monomer to the second multifunctional (meth)acrylate monomer is between 80/20 and 20/80, inclusive.

Item 109 is the article of any of items 67 to 108, wherein the compound includes at least one furanose ring and/or at least one pyranose ring, and the poly(ethyleneoxy) segment is hydroxyl terminated.

Item 110 is the coating composition of any of items 1 to 66, wherein the compound includes at least one furanose ring and/or at least one pyranose ring, and the poly(ethyleneoxy) segment is hydroxyl terminated.

EXAMPLES

Objects and advantages of this disclosure are further illustrated by the following examples, but the particular materials and amounts thereof recited in these examples, as well as other conditions and details, should not be construed to unduly limit this disclosure.

Materials

The following list of materials and their source is referred to throughout the examples.

| Material | Description |
| --- | --- |
| NALCO 2327 | Nalco 2327 Colloidal Silica, 40-41 wt. % solids, 20 nm average particle diameter, from Nalco, Naperville, IL, under trade designation "NALCO 2327" |
| DVSZN004 | Nalco DVSZN004 Colloidal Silica, ~41 wt. % solids, from Nalco, Naperville, IL, under trade designation "NALCO DVSZN004" |
| SNOWTEX OUP | SNOWTEX-OUP Colloidal Silica, from Nissan Chemical, Tokyo, Japan, under trade designation "SNOWTEX OUP" |
| IPS | 3-Isocyanatopropyl-triethoxy silane, 95% from Gelest Inc., Morrisville, PA |
| PEG or A-1230 | 2-[Methoxy(polyethyleneoxy)$_n$ propyl] trimethoxysilane (n = 6-9), from Momentive Performance Materials Inc., Waterford, NY, under trade designation "SILQUEST A-1230" |
| A-174 | 3-(Trimethoxysilyl)propyl methacrylate, from Momentive Performance Materials Inc., Waterford, NY, under trade designation "SILQUEST A-174" |
| A-LINK 25 | methacryloxy propyl trimethoxyl silane, from Momentive Performance Materials Inc., Waterford, NY, under trade designation "A-LINK 25" |
| Dibutyltin dilaurate | Di-n-butyltin dilaurate |
| TWEEN 20 | Also referred to as Polysorbate 20. Polyethylene glycol sorbitan monolaurate, from Alfa-Aesar, Ward Hill, MA, under trade designation "TWEEN 20" |
| TWEEN 80 | Polysorbate 80, Polyethylene glycol sorbitan monolaurate, from Spectrum Chemical, New Brunswick, NJ, under trade designation "TWEEN 80" |
| TWEEN 24 | Polyethylene glycol sorbitan monolaurate, from Croda International, Snaith, UK under trade designation "TWEEN 24" |
| BRIJ L23 | Polyoxyethylene (23) lauryl ether, from Alfa-Aesar, Ward Hill, MA, under trade designation "BRIJ L23" |

-continued

| Material | Description |
|---|---|
| E8415 | EBECRYL 8415, aliphatic 9- and 10-functional urethane acrylates, from Allnex, Brussels, Belgium, under trade designation "EBECRYL 8415" |
| SR415 | SARTOMER SR415, ethoxylated trimethylolpropane triacrylate, from Sartomer, Exton, PA, under trade designation "SARTOMER SR415" |
| SR494 | SARTOMER SR494, ethoxylated pentaerythritol tetraacrylate, from Sartomer, Exton, PA, under trade designation "SARTOMER SR494" |
| SR610 | SARTOMER SR610, polyethylene glycol (600) diacrylate, from Sartomer, Exton, PA, under trade designation "SARTOMER SR610" |
| SR9038 | SARTOMER SR9038, ethoxylated (30) bisphenol A diacrylate, from Sartomer, Exton, PA, under trade designation "SARTOMER SR9038" |
| SR285 | SARTOMER SR285, tetrahydrofurfuryl acrylate, from Sartomer, Exton, PA, under trade designation "SARTOMER SR285" |
| KRM8452 | Aliphatic urethane ten acrylate oligomer, from Allnex Brussels, Belgium, under trade designation "KRM8452" |
| R6420 | Reactive amine synergist from Allnex Brussels, Belgium, under trade designation "KRM8452" |
| IRGACURE 184 | 1-Hydroxy-cyclohexyl-phenyl-ketone, from BASF America, Florham Park, NJ under trade designation "IRGACURE 184" |
| IRGACURE 2959 | 1-[4-(2-Hydroxyethoxy)-phenyl]-2-hydroxy-2-methyl-1-propane-1-one, from BASF America, Florham Park, NJ under trade designation "IRGACURE 2959" |
| $CH_2Cl_2$ | Dichloromethane |
| 1M-2P | 1-Methoxy-2-propanol |
| MEK | Methyl ethyl ketone |
| PET | 2-mil (50 micrometer) thick, super clear polyethylene terephthalate film from E. I. duPont de Nemours, Wilmington, DE, under trade designation "MELINEX 618" |
| PC | 7-mil (178 micrometer) thick, gloss polycarbonate film from Tekra A Division of EIS Inc., New Berlin, WI, under trade designation "TERRAPIN S (7332) ABR2" |

Test Descriptions
Test for Anti-Fogging Property

The anti-fogging property of the coatings according to the invention was determined by placing coated substrates over a 500 mL beaker containing water (at a water temperature of about 50-60° C.). Time was recorded when the tested sample become "fogged". If fogging was observed within 10 seconds, the coating was deemed to have "poor" anti-fogging property. If fogging was observed within 10-30 seconds, the coating was deemed to have "good" anti-fogging property. If fogging was observed after 30 seconds, the coating was deemed to have "excellent" anti-fogging property.

In another variation of the test, the anti-fogging property of the samples was determined as described above after the samples were soaked in water overnight at room temperature.

In yet another variation of the test, the anti-fogging property of the samples was determined as described above after the samples were soaked in hot (50° C.) water for 2 hours.

Test for Measuring % Transmission & Haze

Transmission and haze values disclosed herein were measured using a Haze-Gard Plus haze meter (available from BYK-Gardiner, Silver Springs, Md.) according to the procedure described in ASTM D1003.

Test for Taber Abrasion

The abrasion was evaluated by Taber 5155 Dual Rotary Platform Abraser (available from Taber Industries, North Tonawanda, N.Y.) according to test method ASTM 1044. The abrasion test was performed with CS-10F abrading wheels under 500 grams load for 100 cycles. The wheels were refaced between samples for 25 cycles using an ST-11 re-facing stone. The % transmittance (T %) and % haze (H %) values before and after abrasion were obtained as described above by averaging 4 measurements at four different areas. The change of T % and H % was obtained by subtracting the initial (before abrasion) value from the final (after abrasion) value.

Test for Durability of Coatings

Dry or wet mechanical durability of the anti-fog coatings was determined by subjecting the coated substrates to linear abrasion test. The linear abrasion test was carried out by wiping the coatings with a paper towel (or a wet paper towel) for 600 cycles under a constant force of about 1400 grams of force (13.73 N). Then the coatings were rated visually (as pass or fail) for haze and for the presence of scratches.

Alternatively, the durability of the anti-fog coatings was tested using the Rubber Squeegee Test which simulated the window film installation. To run the test, water was sprayed onto the surface of the anti-fog coatings, after about 20 seconds, the water was squeegeed off from the surface (20 cycles) using a rubber squeegee. Then, excess water was wiped away and the surface was dried in air for 10 minutes. Then the appearance and anti-fogging performance of the coatings was rated as "pass" if no scratches and no fogging was observed, and "fail" if there were scratches or the coatings fogged.

Method for Determining Molar % Coverage

Molar % coverage of a silica nanoparticle surface by an (functional) organic alkoxysilane refers to the percentage of the total milli-molar (mmole) reactive silanol groups per gram of a particle surface that is attached to an organic alkoxysilane.

Preparative Example 1 (PE1)

Synthesis of Triethoxysilyl Substituted Surfactant TWEEN 20 (TWEEN 20:IPS Mole Ratio of 1:1.5)

A reaction flask was assembled with a cold-water-running condenser. Into the reaction flask was placed 100 g of $CH_2Cl_2$, TWEEN 20 (MW=1228, 245.6 g, 0.2 mol), IPS (3-triethoxysilylpropyl isocyanate, 74.2 g, 0.3 mol) and a catalytic amount (1-2 drops) of dibutyltin dilaurate. The reaction solution was stirred and heated at 50° C. overnight. After reaction, the reaction solution was subjected to rotayap under water vacuum pressure to remove the reaction solvent $CH_2Cl_2$ completely. The final surfactant silane product was a viscous liquid.

Preparative Examples 1a-1c (PE1a-PE1c)

PE1a-PE1c were prepared in the same manner as PE1, except that TWEEN 20 was replaced with equivalent amounts (moles) of TWEEN 80 (for PE1a), TWEEN 24 (for PE1b) or BRIJ L23 (for PE1c).

Preparative Example 2 (PE2)

Synthesis of Nanoparticles with Functional Silane Surface Modification

Silica nanoparticles with functional silane surface modification were prepared by slowly adding a desired amounts of functional silanes to a selected silica nanoparticle dispersion and reacting. The relative amounts of the silica nanoparticle dispersion to the functional silanes were determined on the basis of equivalent surface coverage desired. As an example of the general process, a nanosilica surface modified with polyethyleneoxide silane, a surfactant silane (e.g., TWEEN 20 silane from PE1 above) and methacryloxypropyl silane in different molar ratios was prepared as follows:

250 g NALCO 2327 silica nanoparticle dispersion was placed in a 500 mL glass jar. To the dispersion solution was added 260 g of 1-methoxy-2-propanol and 19.2 g of TWEEN 20 silane (prepared as described above) dissolved in 10 g of 1-methoxy-2-propanol (MW=1599.04, 0.012 mole, 20% molar coverage) through a drop funnel. After addition, the drop funnel was rinsed with an additional 10 g of 1-methoxy-2-propanol. The solution was stirred and heated at 80° C. for 3 hours, then to the solution was added a mixture of A-174 (2.98 g, MW=248, 0.012 mole, 20% molar coverage) and polyethyleneoxide silane (12.6 g, MW=525, 0.024 mole, 40% molar coverage) in 40 g 1-methoxy-2-propanol. The solution was stirred and heated at 80° C. overnight. After reaction was complete, the solution was subjected to azeotropic distillation by roto-vap to remove all the residual water in the solution. This final solution was clear and contained about 40 wt. % functionalized nanosilica.

In a similar fashion, nanosilica surfaces covered with different ratios of polyethyleneoxide silane, surfactant silane and (meth)acryloxylprpyl silane were prepared as described in the Tables, below. In the case of 20 nm sized silica nanoparticles (i.e. NALCO 2327) surface covered with 30 molar % or more TWEEN 20 silane, the mass ratio of water to 1-methoxy-2-propanol was 25:75.

Preparative Example 3 (PE3)

Synthesis of Nanoparticles with Functional Surface Modification

Surface functionalized silica nanoparticles of PE3 were prepared in the same manner as PE2 except that no TWEEN 20 silane (or any other surfactant silane) was used. The resulting functionalized silica nanoparticles were functionalized using appropriate amounts of A-174 (to achieve about 40 molar % coverage) and PEG (to achieve about 20 molar % coverage).

Preparative Examples 3a-3d (PE3a-PE3d)

PE3a-PE3d Surface functionalized silica nanoparticles were prepared in essentially the same manner as PE2 except that the type and amount of surface functionalization was varied.

For PE3a, NALCO 2327 silica nanoparticles were functionalized using appropriate amounts of PEG (to achieve about 70 molar % coverage) and TWEEN 20 silane (to achieve about 30 molar % coverage).

For PE3b, NALCO 2327 silica nanoparticles were functionalized using appropriate amounts of PEG (to achieve about 35 molar % coverage) and A-174 silane (to achieve about 15 molar % coverage).

For PE3c, DVSZN004 silica nanoparticles were functionalized using appropriate amounts of PEG (to achieve about 35 molar % coverage) and A-174 silane (to achieve about 15 molar % coverage).

For PE3d, SNOWTEX-OUP silica nanoparticles were functionalized using appropriate amounts of PEG (to achieve about 100 molar % coverage).

Examples 1-3 (EX1-EX3) and Comparative Example A (CEA)

Comparative Example A was a bare PET film with no further treatment. EX1-EX3 samples were prepared by coating respective coating compositions on PET film substrates using a C-25 Meyer bar (wet coating thickness of 25 micrometer). The coated substrates were then dried in an oven at 80° C. for about 3 minutes and then UV cured under a nitrogen atmosphere using Fusion D bulb at 80% power and at a line speed of 1 meters/minute (Fusion UV Systems, Inc., Gaithersburg, Md.). The coating compositions for each Example was prepared by mixing surface functionalized silica nanoparticles (prepared in a similar manner as described in PE 2) with a resin mixture (i.e., acrylic monomer mixture) at desired ratios, and then diluting with MEK to obtain the desired % solids content (i.e., about 40 wt. % solids). The components were mixed until a uniform mix was obtained. The specific details of the functionalized silica nanoparticles used in EX1-EX3 are provided in Table 1, below. The specific compositions of the coating solutions used in EX1-EX3 are summarized in Table 2, below.

TABLE 1

| Component | Amount used to prepare functionalized nanosilica particle for Example (g) | | |
| --- | --- | --- | --- |
|  | EX 1 | EX2 | EX3 |
| NALCO2327 | 240 | 240 | 240 |
| TWEEN 20 silane (PE1) | 19.03 | 14.27 | 9.514 |
| A-1230 | 11.90 | 13.39 | 14.88 |
| A-174 | 2.96 | 2.96 | 2.96 |
| Solids content of functionalized silica nanoparticle dispersion | 35.21 wt. % | 46.83 wt. % | 41.19 wt. % |
| Molar % coverage of A-1230:TWEEN 20 silane:A-174 on silica nanonarticles | 40:20:20 | 45:15:20 | 50:10:20 |

TABLE 2

| Component | Amount used to prepare coating compositions for Example (g) | | |
| --- | --- | --- | --- |
|  | EX 1 | EX2 | EX3 |
| KRM8452 | 1.05 | 1.05 | 1.05 |
| SR415 | 0.45 | 0.45 | 0.45 |
| Functionalized silica nanoparticles (prepared as described in Table 1 above) | 9.94 | 7.47 | 8.5 |
| IRGACURE 184 | 0.075 | 0.075 | 0.075 |
| MEK | 0.91 | 3.38 | 2.35 |
| R6420 | 0.075 | 0.075 | 0.075 |
| Resin/silica nanoparticle ratio | 30:70 | 30:70 | 30:70 |
| Solids content of coating solution | 40% | 40% | 40% |

The prepared EX1-EX3 and CEA samples were tested for their durability and anti-fog performance using the test methods described above. The results are summarized in Table 3, below.

TABLE 3

| Test | CEA | EX1 | EX2 | EX3 |
|---|---|---|---|---|
| Initial haze | 0.52 | 0.60 | 0.75 | 0.6 |
| Initial % transmittance | 90.2 | 91.3 | 91.2 | 92.0 |
| Tabor haze after 100 cycles | N/A* | 6.0 | 4.76 | 4.06 |
| Initial anti-fog performance | N/A* | good | good | good |
| Rubber Squeegee Test | N/A* | pass | pass | pass |
| Dry abrasion test after 600 cycles | N/A* | pass | pass | pass |
| Wet abrasion test after 600 cycles | N/A* | pass | pass | fair |

*N/A means not measured.

Comparative Examples B-G (CEB-CEG)

CEB-CEG samples were prepared in essentially the same manner as EX1-EX3 (described above) by coating respective coating compositions on PET film substrates using a #12 Meyer bar and curing at 80° C. for 5 minutes followed by UV curing (using Model MC-6RQN, H-bulb, 100% power, under nitrogen atmosphere at a line speed of 40 feet/minute (12 meters/minute) from Fusion UV Systems, Inc., Gaithersburg, Md.). However, for CEB-CEG samples the functionalized silica nanoparticles were those prepared in PE3 and therefore did not include any surfactant silane functionalization. The coating compositions for each Example were prepared by mixing surface functionalized silica nanoparticles (prepared in a similar manner as described in PE3) with a resin mixture (i.e., acrylic monomer mixture) at desired ratios including about 1-2 wt. % of a photoinitiator, and then diluting with a 1M-2P to obtain the desired % solids content (about 40 wt. % solids). Since the functionalized silica nanoparticles of CEB-CEG did not have any surfactant silane functionalization, varying amounts of free surfactant was added to the coating compositions. The specific details of the coating compositions of CEB-CEG are summarized in Table 4, below. The amounts of free surfactant reported in Table 4 was reported as equivalent molar % coverage on silica nanoparticles.

CEB-CEG samples were tested for their anti-fog performance using the test methods described above. The results are summarized in Table 5, below.

TABLE 5

| | | Anti-fog Performance | |
|---|---|---|---|
| Example | Comments | After Water (RT) soak overnight | After Water (50° C.) soak for 2 hours |
| CEB | Poor | No anti-fogging | No anti-fogging |
| CEC | Many cracks, delaminated | >30 s | >30 s |
| CED | Many cracks, delaminated | >30 s | >30 s |
| CEE | Cracks, some area delaminated | >30 s | >30 s |
| CEF | Cracks, some area delaminated | >30 s | >30 s |
| CEG | Poor | No anti-fogging | No anti-fogging |

Examples 4-25 (EX4-EX25) and Comparative Example H (CEH) EX4-EX25 and CEH samples were prepared in the same manner as EX1-EX3 (described above) by coating respective coating compositions on PET film substrates using a #12 Meyer bar and curing at 80° C. for 5 minutes followed by UV curing (using Model MC-6RQN, H-bulb, 100% power, under nitrogen atmosphere at a line speed of 40 feet/minute (12 meters/minute) from Fusion UV Systems, Inc., Gaithersburg, Md.). The coating compositions for each Example were prepared by mixing surface functionalized silica nanoparticles (prepared in a similar manner as described in PE 2) with a resin mixture (i.e., acrylic monomer mixture) at desired ratios including about 1-2 wt. % of a photoinitiator, and then diluting with a 1M-2P to obtain the desired % solids content (about 40 wt. % solids). The specific details of the coating compositions of EX4-EX25 are summarized in Table 6, below.

TABLE 4

| Example | Silica Nanoparticles | Nanoparticle surface functionalization, Molar % coverage | | Free surfactant Type, Molar % Coverage | Silica/Resin Ratio | Acrylic monomers used (% wt. ratio) |
|---|---|---|---|---|---|---|
| | | PEG | A-174 | | | |
| CEB | NALCO 2327 | 40 | 20 | None | 70/30 | E8415:SR415 (70:30) |
| CEC | NALCO 2327 | 40 | 20 | TWEEN 20, 20 | 70/30 | E8415:SR415 (70:30) |
| CED | NALCO 2327 | 40 | 20 | TWEEN 20, 20 | 70/30 | E8415:SR415 (60:40) |
| CEE | NALCO 2327 | 40 | 20 | PE1, 20 | 70/30 | E8415:SR415 (70:30) |
| CEF | NALCO 2327 | 40 | 20 | PE1, 20 | 70/30 | E8415:SR415 (60:40) |
| CEG | NALCO 2327 | 70 | 30 | None | 70/30 | E8415:SR415 (70:30) |

TABLE 6

| Example | Silica Nanoparticles | Nanoparticle surface functionalization, Molar % coverage | | | Silica/Resin Ratio | Acrylic monomers used (% wt. ratio) |
| --- | --- | --- | --- | --- | --- | --- |
| | | PEG | A-174 | PE1 | | |
| CEH | NALCO 2327 | 30 | 20 | 30 | 60/40 | E8415 (100) |
| EX4 | NALCO 2327 | 50 | 20 | 30 | 70/30 | E8415:SR415 (70:30) |
| EX5 | NALCO 2327 | 65 | 20 | 15 | 70/30 | E8415:SR415 (70:30) |
| EX6 | NALCO 2327 | 65 | 20 | 15 | 70/30 | E8415:SR415 (30:70) |
| EX7 | NALCO 2327 | | 50 | 50 | 70/30 | E8415:SR415 (70:30) |
| EX8 | DVSZN004 | 65 | 10 | 25 | 70/30 | E8415:SR415 (70:30) |
| EX9 | NALCO 2327 | 50 | 20 | 10 | 70/30 | E8415:SR415 (60:40) |
| EX10 | NALCO 2327 | 45 | 20 | 15 | 70/30 | E8415:SR415 (70:30) |
| EX11 | NALCO 2327 | 40 | 20 | 20 | 70/30 | E8415:SR415 (70:30) |
| EX12* | NALCO 2327 | 40 | 20 | 20 | 70/30 | E8415:SR415 (70:30) |
| EX13 | NALCO 2327 | 40 | 20 | 20 | 70/30 | E8415:SR415 (60:40) |
| EX14 | NALCO 2327 | 30 | 20 | 30 | 70/30 | E8415:SR415 (60:40) |
| EX15 | NALCO 2327 | 20 | 20 | 40 | 70/30 | E8415:SR415 (70:30) |
| EX16 | NALCO 2327 | 20 | 20 | 40 | 50/50 | E8415:SR415 (50:50) |
| EX17 | NALCO 2327 | 10 | 20 | 50 | 50/50 | E8415:SR415 (50:50) |
| EX18 | NALCO 2327 | 0 | 40 | 40 | 60/40 | E8415:SR415 (60:40) |
| EX19 | NALCO 2327 | 30 | 20 | 20 | 70/30 | E8415:SR415 (60:40) |
| EX20 | NALCO 2327 | 40 | 20 | 20 | 70/30 | E8415:SR415:SR494 (60:30:10) |
| EX21 | NALCO 2327 | 45 | 20 | 15 | 70/30 | E8415:SR415:SR494 (60:30:10) |
| EX22 | NALCO 2327 | 50 | 20 | 10 | 70/30 | E8415:SR415:SR494 (60:30:10) |
| EX23 | NALCO 2327 | 40 | 20 | 20 | 70/30 | E8415:SR610(70:30) |
| EX24 | NALCO 2327 | 40 | 20 | 20 | 70/30 | E8415:SR9038(70:30) |
| EX25 | NALCO 2327 | 20 | 20 | 40 | 60/40 | E8415:SR9038(70:30) |

*EX12 sample was dried at 120° C. for 5 minutes before UV curing.

Examples 26-34 (EX26-EX34)

EX26-EX34 samples were prepared in the same manner as EX4-EX25 (described above) by coating respective coating compositions on PET film substrates using a #12 Meyer bar and curing. The coating compositions for each Example were prepared by mixing surface functionalized silica nanoparticles (prepared in a similar manner as described in PE 2) with a resin mixture (i.e., acrylic monomer mixture) at desired ratios including about 1-2 wt. % of a photoinitiator, and then diluting with a 1M-2P to obtain the desired % solids content (about 40 wt. % solids). The surface functionalization on the silica nanoparticles, namely the surfactant silane used, was varied. For EX26-EX32, the silica nanoparticles were functionalized as described in PE2 except using surfactant silane of PE1a while for EX33 and EX34 the silica nanoparticles were functionalized with surfactant silanes of PE1b, and PE1c, respectively. The specific details of the coating compositions of EX26-EX34 are summarized in Table 7, below.

TABLE 7

| Example | Silica Nanoparticles | Nanoparticle surface functionalization, Molar % coverage | | | Silica/Resin Ratio | Acrylic monomers used (% wt. ratio) |
| --- | --- | --- | --- | --- | --- | --- |
| | | PEG | A-174 | Surfactant silane | | |
| EX26 | NALCO 2327 | 45 | 20 | 15 | 70/30 | E8415:SR415 (70:30) |
| EX27 | NALCO 2327 | 45 | 20 | 15 | 70/30 | E8415:SR415 (60:40) |
| EX28 | NALCO 2327 | 45 | 20 | 15 | 70/30 | E8415:SR415:SR494 (60:30:10) |
| EX29 | NALCO 2327 | 40 | 20 | 20 | 70/30 | E8415:SR415 (60:40) |
| EX30 | NALCO 2327 | 40 | 20 | 20 | 70/30 | E8415:SR415:SR494 (60:30:10) |
| EX31 | NALCO 2327 | 30 | 20 | 30 | 60/40 | E8415:SR415 (50:50) |
| EX32 | NALCO 2327 | 20 | 20 | 40 | 60/40 | E8415:SR415 (70:30) |
| EX33* | NALCO 2327 | 40 | 20 | 20 | 70/30 | E8415:SR415 (60:40) |
| EX34* | NALCO 2327 | 40 | 20 | 20 | 70/30 | E8415:SR415 (60:40) |

*EX33 and EX34 samples were dried at 120° C. for 5 minutes before UV curing

EX4-EX34 samples were tested for their anti-fog performance using the test methods described above. The results are summarized in Table 8, below.

TABLE 8

Anti-fog Performance

| Example | Initial | After Water (RT) soak overnight | After Water (50° C.) soak for 2 hours |
|---|---|---|---|
| CEH | Sample haze | Sample haze | Sample haze |
| EX4 | >30 s | 3 s (2 hrs: 4 s) | >30 s |
| EX5 | >30 s | >30 s | >30 s |
| EX6 | >30 s | >30 s | >30 s |
| EX7 | >30 s | >30 s | >30 s, some condensation |
| EX8 | >30 s | 1 s | 2 s |
| EX9 | >30 s | >30 s | >30 s |
| EX10 | >30 s | >30 s | >30 s, some delamination |
| EX11 | >30 s | >30 s, top ~5 s condense | >30 s, ~5 s condense |
| EX12 | >30 s | 1 s | >30 s, tiny delamination |
| EX13 | >30 s | >30 s | >30 s, middle condense |
| EX14 | >30 s | >30 s | >30 s swelling |
| EX15 | >30 s | >30 s (condensation) | >30 s (swelling |
| EX16 | >30 s | >30 s (condensation) | >30 s (condensation) |
| EX17 | >30 s | >30 s | 3-6 s |
| EX18 | >30 s | >30 s | >30 s (condensation) |
| EX19 | >30 s | >30 s (condense @ 5 s) | >30 s |
| EX20 | >30 s | 2 s | >30 s |
| EX21 | >30 s | >30 s | >30 s |
| EX22 | >30 s | >30 s | mixed |
| EX23 | >30 s | >30 s (some condensation) | >30 s |
| EX24 | >30 s | >30 s | >30 s |
| EX25 | >30 s | >30 s | >30 s (condensation) |
| EX26 | >30 s | >30 s | >30 s, some condensation |
| EX27 | >30 s | >30 s | >30 s |
| EX28 | >30 s | >30 s, some condensation | >30 s, some condensation |
| EX29 | >30 s | >30 s | >30 s |
| EX30 | >30 s | >30 s, some condensation | >30 s |
| EX31 | >30 s | >30 s | >30 s (condensation) |
| EX32 | >30 s | >30 s | >30 s |
| EX33 | >30 s | >30 s | >30 s; Bottom condense @ 5 s |
| EX34 | >30 s | >30 s (cracks, peel-off) | >30 s (cracks, peel-off) |

Selected Example and Comparative Example samples were tested using the Taber Abrasion test described above. The results are summarized in Table 9, below.

TABLE 9

| Example | Average Initial Transmission (% T) | Average Initial Haze (% H) | Average Final Transmission (% T) | Average Final Haze (% H) | Average Δ % T | Average Δ % H |
|---|---|---|---|---|---|---|
| CEC | 91.4 | 1.41 | 90.6 | 3.71 | −0.8 | 2.3 |
| CED | 91.4 | 1.41 | 90.7 | 5.67 | −0.7 | 4.26 |
| CEE | 91.4 | 1.43 | 90.5 | 5.22 | −0.9 | 3.79 |
| CEF | 91.5 | 1.41 | 90.6 | 4.29 | −0.9 | 2.88 |
| EX9 | 91.6 | 1.48 | 90.5 | 5.07 | −1.1 | 3.59 |
| EX10 | 91.6 | 1.39 | 90.6 | 4.3 | −1 | 2.91 |
| EX11 | 91.6 | 1.44 | 90.5 | 5.8 | −1.1 | 4.36 |
| EX13 | 91.6 | 1.48 | 90.5 | 5.59 | −1.1 | 4.11 |
| EX14 | 91.5 | 2.58 | 90.5 | 10.8 | −1 | 8.22 |
| EX15 | 91.5 | 2.89 | 90.5 | 9.3 | −1 | 6.41 |
| EX23 | 91.4 | 1.69 | 90.6 | 4.6 | −0.8 | 2.91 |
| EX24 | 91.4 | 1.59 | 90.6 | 5.65 | −0.8 | 4.06 |
| EX25 | 91.4 | 1.42 | 90.4 | 11 | −1 | 9.58 |
| EX31 | 91.4 | 1.49 | 90.3 | 7.69 | −1.1 | 6.2 |
| EX32 | 91.3 | 1.51 | 90.5 | 7.87 | −0.8 | 6.36 |
| EX33 | 91.5 | 1.46 | 90.7 | 4.94 | −0.8 | 3.48 |

Examples 35-47 (EX35-EX47) and Comparative Example I (CEI)

EX35-EX47 and CEI samples were prepared in the same manner as EX1-EX3 (described above) by coating respective coating compositions on PET or PC film substrates using a #24 Meyer bar and curing at 80° C. for 5 minutes followed by UV curing. The coating compositions for each Example were prepared by mixing two types of surface functionalized silica nanoparticles (selected from PE3a-PE3d) with a resin mixture (i.e., acrylic monomer mixture) at desired ratios including about 1-2 wt. % of a photoinitiator, and then diluting with 1M-2P to obtain the desired % solids content (about 40 wt. % solids). The coating composition of CEI did not contain any functionalized silica nanoparticles. The specific details of the coating compositions of EX35-EX47 and CEI are summarized in Table 10, below.

TABLE 10

| Example | Functionalized silica nanoparticle (% wt. ratio) PE3a | PE3b | PE3c | PE3d | Silica/Resin Ratio | Acrylic monomers used (% wt. ratio) | Substrate |
|---|---|---|---|---|---|---|---|
| CEI | 0 | 0 | 0 | 0 | 70/30 | E8415:SR415(70:30) | PET |
| EX35 | 50 | 50 | | | 70/30 | E8415:SR415(70:30) | PET |
| EX36 | 50 | | 50 | | 70/30 | E8415:SR415(70:30) | PET |
| EX37 | 30 | | | 70 | 70/30 | SR494:SR415:SR285:A174 (57.0:19.5:13.5:10) | PET |
| EX38 | 30 | | | 70 | 70/30 | SR494:SR415:SR285:A174 (57.0:19.5:13.5:10) | PC |
| EX39 | 40 | | | 60 | 70/30 | SR494:SR415:SR285:A174 (57.0:19.5:13.5:10) | PET |
| EX40 | 40 | | | 60 | 70/30 | SR494:SR415:SR285:A174 (57.0:19.5:13.5:10) | PC |
| EX41 | 50 | | | 50 | 70/30 | SR494:SR415:SR285:A174 (57.0:19.5:13.5:10) | PET |
| EX42 | 50 | | | 50 | 70/30 | SR494:SR415:SR285:A174 (57.0:19.5:13.5:10) | PC |
| EX43 | 60 | | | 40 | 70/30 | SR494:SR415:SR285:A174 (57.0:19.5:13.5:10) | PET |
| EX44 | 60 | | | 40 | 70/30 | SR494:SR415:SR285:A174 (57.0:19.5:13.5:10) | PC |
| EX45 | 70 | | | 30 | 70/30 | SR494:SR415:SR285:A174 (57.0:19.5:13.5:10) | PET |
| EX46 | 50 | | | 50 | 50/50 | SR494:SR415:SR285:A174 (57.0:19.5:13.5:10) | PET |
| EX47 | 30 | | | 70 | 50/50 | SR494:SR415:SR285:A174 (57.0:19.5:13.5:10) | PC |

CEI and EX35-EX47 samples were tested for their anti-fog performance using the test methods described above. The results are summarized in Table 11, below.

TABLE 11

| | Anti-fog Performance | |
|---|---|---|
| Example | Initial | After Water (RT) soak overnight |
| CEI | Fogging | |
| EX35 | >30 s | >30 s |
| EX36 | >30 s | >30 s |
| EX37 | >30 s | >30 s |
| EX38 | >30 s | 10 s |
| EX39 | >30 s | 8 s |
| EX40 | >30 s | >30 s |
| EX41 | >30 s | >30 s |
| EX42 | >30 s | >30 s |
| EX43 | >30 s | 9 s |
| EX44 | >30 s | 10 s |
| EX45 | >30 s | 7 s |
| EX46 | >30 s | 8 s |
| EX47 | >30 s | 5 s |

Various modifications and alterations to this invention will be apparent to those skilled in the art without departing from the spirit and scope of the invention. It should be understood that this invention is not intended to be unduly limited by the illustrative embodiments set forth herein and that such embodiments are presented by way of example only with the scope of the invention intended to be limited only by the claims which follow.

What is claimed is:

1. A coating composition comprising:
   A) a plurality of silica nanoparticles functionalized with:
      i) a compound comprising a poly(ethyleneoxy) segment containing at least one hydroxyl group, at least one functional silane, and optionally a hydrophobic group, wherein the poly(ethyleneoxy) segment comprises a polyethylene oxide segment having at least one group selected from a phenol, a propoxy, an ester, an aminopolyol, a vegetable oil, a quaternary ammonium, or a combination thereof, and wherein the compound comprises a molecular weight ranging from 500 grams per mole to 25,000 grams per mole, inclusive;
      ii) an alkenyl silane; and
      iii) a dispersing agent;
   B) a first multifunctional (meth)acrylate monomer; and
   C) a second multifunctional (meth)acrylate monomer.

2. The coating composition of claim 1, wherein the first multifunctional (meth)acrylate monomer comprises 6 to 10 acrylate functionalities, inclusive.

3. The coating composition of claim 1, wherein the compound comprises an ester.

4. The coating composition of claim 1, wherein the compound comprises an ethoxylated ester.

5. The coating composition of claim 1, wherein the compound includes at least one furanose ring and/or at least one pyranose ring, and the poly(ethyleneoxy) segment is hydroxyl terminated.

6. The coating composition of claim 1, wherein the dispersing agent comprises at least one of a polyethyleneoxide alkoxysilane, a hydroxycarbonyl alkyl trialkoxysilane, a zwitterionic alkoxysilane, or an acrylic alkoxysilane.

7. The coating composition of claim 1, wherein the alkenyl silane comprises 3-(trimethoxysilyl)propyl methacrylate.

8. The coating composition of claim 1, wherein the first multifunctional (meth)acrylate monomer comprises a multifunctional aliphatic acrylate, a multifunctional urethane acrylate, a multifunctional polyether acrylate, a multifunctional polyester acrylate, a multifunctional epoxy acrylate, or a combination thereof.

9. The coating composition of claim 1, wherein the second multifunctional (meth)acrylate monomer is of the following Formula I:

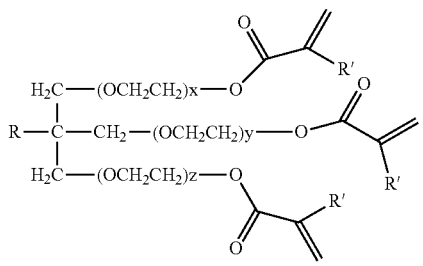

wherein R is a C1-C6 alkyl group, acryloyl, or vinyl;
R' is methyl or H; and
x, y, and z are independently an integer of at least 1.

10. The coating composition of claim 8, comprising at least one ethyleneoxide multifunctional acrylate monomer present in an amount of 15% to 55% by weight of the combined weight of the first multifunctional (meth)acrylate monomer and the second multifunctional (meth)acrylate monomer.

11. The coating composition of claim 1, wherein the plurality of silica nanoparticles functionalized with the compound are present in an amount of at least 40% by weight of the total coating composition.

12. The coating composition of claim 1, wherein a weight ratio of the plurality of silica nanoparticles functionalized with the compound to the combined total of all of the multifunctional acrylate monomers present in the coating composition is between 40/60 and 80/20, inclusive.

13. A coating composition comprising:
A) a first plurality of silica nanoparticles functionalized with:
  i) a compound comprising a poly(ethyleneoxy) segment containing at least one hydroxyl group, at least one functional silane, and optionally a hydrophobic group, wherein the poly(ethyleneoxy) segment comprises a polyethylene oxide segment having at least one group selected from a phenol, a propoxy, an ester, an aminopolyol, a vegetable oil, a quaternary ammonium, or a combination thereof, and wherein the compound comprises a molecular weight ranging from 500 grams per mole to 25,000 grams per mole, inclusive; and
  ii) a dispersing agent;
B) a second plurality of silica nanoparticles functionalized with:
  i) an alkenyl silane; and
  ii) the dispersing agent;
C) a first multifunctional (meth)acrylate monomer; and
D) a second multifunctional (meth)acrylate monomer.

14. An article comprising a substrate and a coating, wherein the coating comprises the cured reaction product of a coating composition of claim 1.

15. The article of claim 14, wherein the silica nanoparticles have an average diameter of between 4 nanometers and 120 nanometers, inclusive.

16. The article of claim 14, wherein the plurality of silica nanoparticles functionalized with the compound are present in an amount of at least 40% by weight of the article.

* * * * *